United States Patent
Siddique et al.

(10) Patent No.: US 9,875,573 B2
(45) Date of Patent: Jan. 23, 2018

(54) METHOD AND APPARATUS FOR RENDERING A 3-DIMENSIONAL SCENE

(71) Applicant: Meggitt Training Systems Inc., Suwanee, GA (US)

(72) Inventors: Ahmed Siddique, Suwanee, GA (US); James Napier, Buford, GA (US); Edric Rominger, Atlanta, GA (US)

(73) Assignee: Meggitt Training Systems, Inc., Suwanee, GA (US)

( * ) Notice: Subject to any disclaimer, the term of this patent is extended or adjusted under 35 U.S.C. 154(b) by 0 days.

(21) Appl. No.: 14/660,767

(22) Filed: Mar. 17, 2015

(65) Prior Publication Data

US 2015/0302635 A1 Oct. 22, 2015

Related U.S. Application Data

(60) Provisional application No. 61/954,473, filed on Mar. 17, 2014.

(51) Int. Cl.
 *G06T 15/20* (2011.01)
 *G06T 15/04* (2011.01)

(52) U.S. Cl.
 CPC ............ *G06T 15/205* (2013.01); *G06T 15/04* (2013.01); *G06T 15/20* (2013.01);
 (Continued)

(58) Field of Classification Search
 CPC ............. H04N 5/23238; H04N 19/597; H04N 13/0445; H04N 13/0282; H04N 13/0402;
 (Continued)

(56) References Cited

U.S. PATENT DOCUMENTS 6,496,183 B1 12/2002 Bar-Nahum
6,533,420 B1 3/2003 Eichenlaub
(Continued)

FOREIGN PATENT DOCUMENTS

WO WO-2008/086049 A1 7/2008
WO WO-2012/131149 A1 10/2012

OTHER PUBLICATIONS

Halle, Michael W., *Multiple Viewpoint Rendering for Three-Dimensional Displays*, Massachusetts Institute of Technology, Jun. 1997, pp. 1-164.
(Continued)

*Primary Examiner* — Haixia Du
(74) *Attorney, Agent, or Firm* — Hackler Daghighian Martino & Novak (57) ABSTRACT

Provided herein are methods and systems to provide for parallax correction for multiple eye-points in a single viewpoint within a Homogeneous 3-Dimensional (3D) virtual environment. In preferred embodiments, the systems and methods are used as part of a virtual training environment where multiple participants are participating simultaneously. The methods and systems render multiple objects from multiple eye-points by creating custom projection matrix for each eye-point. Each rendered object is overlaid over the background and other images rendered with the standard eye-point projection matrix. Preferred embodiments use the same view matrix for all renderings.

20 Claims, 7 Drawing Sheets

(52) U.S. Cl.
CPC ............... *G06T 2207/10021* (2013.01); *G06T 2207/10028* (2013.01); *G06T 2207/20081* (2013.01); *G06T 2210/61* (2013.01)

(58) Field of Classification Search
CPC ............. H04N 13/004; H04N 13/0275; H04N 13/0278; G06T 15/205; G06T 2207/20221; G06T 3/0062; G06T 17/00; G06T 15/20; G06T 15/503; G06T 19/003; G06T 17/05; G06T 19/006; G06T 2215/16; G06T 11/00; G06T 2219/024; G06T 7/194; G06T 15/00; G06T 15/10; G06T 3/4038
See application file for complete search history.

(56) References Cited

U.S. PATENT DOCUMENTS

| | | | |
|---|---|---|---|
| 7,796,134 | B2 | 9/2010 | Vesely et al. |
| 8,111,909 | B2 | 2/2012 | Orth et al. |
| 8,350,846 | B2 | 1/2013 | Mejdrich et al. |
| 8,581,905 | B2 | 11/2013 | Mitchell |
| 2009/0128552 | A1* | 5/2009 | Fujiki ..................... G06T 15/06 345/419 |
| 2011/0273451 | A1 | 11/2011 | Salemann |
| 2012/0005624 | A1 | 1/2012 | Vesely |
| 2012/0094773 | A1* | 4/2012 | Suzuki ..................... A63F 13/79 3/79 |
| 2012/0326946 | A1* | 12/2012 | Yuan ..................... G06F 3/1446 345/1.3 |
| 2013/0093767 | A1 | 4/2013 | Booth, Jr. et al. |
| 2013/0155205 | A1* | 6/2013 | Kosakai ................. G03B 17/20 348/50 |
| 2014/0225887 | A1* | 8/2014 | Aguirre-Valencia ............ H04N 13/0278 345/419 |

OTHER PUBLICATIONS

International Search Report And Written Opinion Of The International Searching Authority, dated Jun. 29, 2015 for PCT/US15/21082, International Filing Date: Mar. 17, 2015.

* cited by examiner

Multiple Models in a Single View-Point

METHOD AND APPARATUS FOR RENDERING A 3-DIMENSIONAL SCENE

RELATED APPLICATIONS

This application claims the benefit of U.S. Provisional Patent Application No. 61/954,473, filed Mar. 17, 2014, and titled "METHOD AND APPARATUS FOR RENDERING A 3-DIMENSIONAL SCENE," which is incorporated herein in its entirety by reference.

FIELD

In the present patent document, systems and methods are provided for parallax correction for multiple eye-points in a single viewpoint within a Homogeneous 3-Dimensional (3D) virtual environment.

BACKGROUND

Figure 1A:
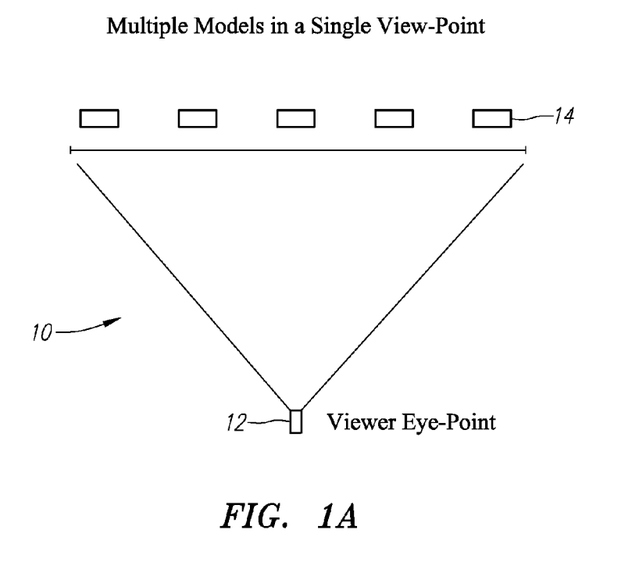
FIG. 1A illustrates a top-down view of how multiple models are perceived in a single eye-point system.
Figure 1B:
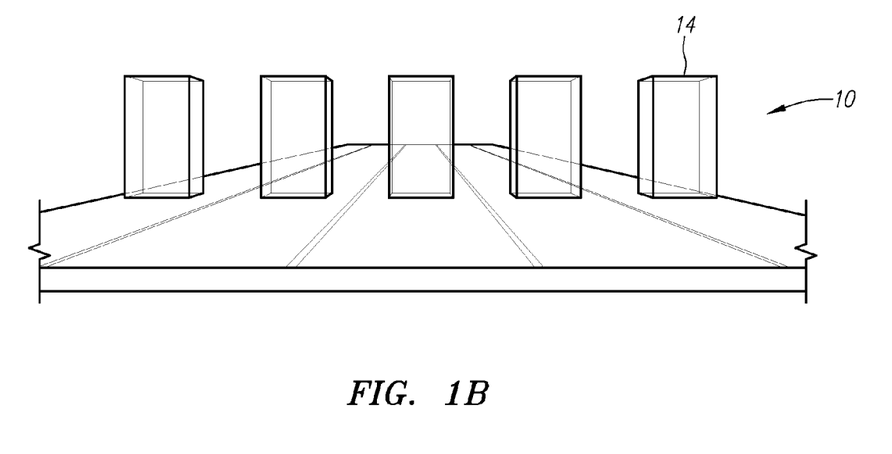
FIG. 1B illustrates a perspective view of how the five rectangular objects spread across a scene would render in a system using a single eye-point perspective.

Traditionally, there are two approaches for displaying targets for each eye-point's perspective in a 3D virtual training environment. The simplest approach is to render the entire view from a single perspective, which will result in the target being perspectively correct strictly for the person looking at the scene from a single eye-point. FIG. 1A illustrates a top-down view of how multiple models 14 are perceived in a single eye-point system 10. FIG. 1B illustrates a perspective view of how the five rectangular objects 14 spread across a scene would render in a system using a single eye point 12.

Figure 2:
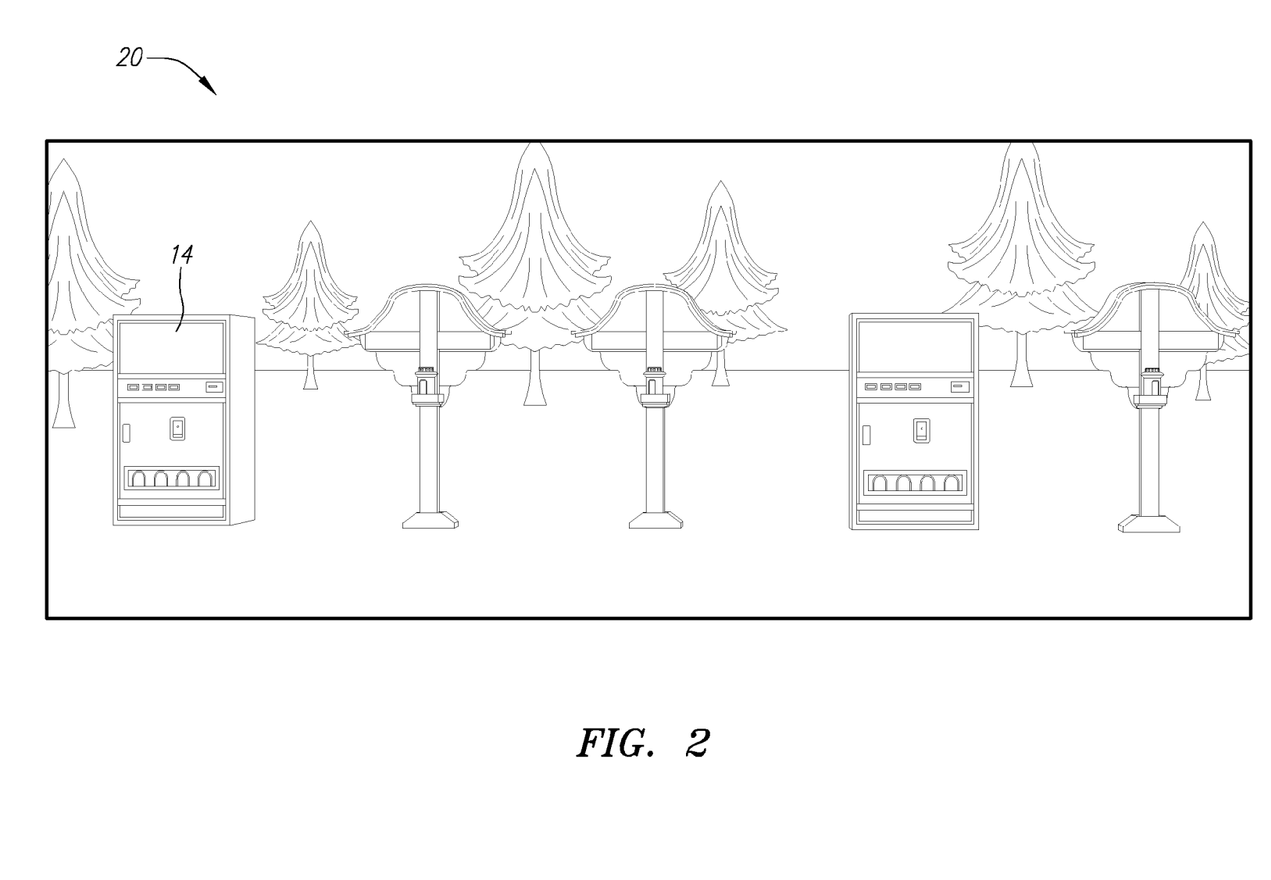
FIG. 2 illustrates a rendering for a scene with a single eye-point and no perspective correction for multiple viewers.

FIG. 2 is an example of scene rendered with a single viewpoint and no perspective correction for multiple viewers. Notice that the side of object 14 is clearly visible because of the perspective added for the centrally located single eye-point.

One drawback to the single eye-point rendering approach is that for eye-points other than the eye-point that served as the rendering eye-point, the models will be perspectively incorrect. When viewed from any position other than the rendering point, the models will have parallax (i.e. traditional parallax error). The models may also appear to be the incorrect distance.

This is a problem in training simulations where multiple people are participating. For example, in a firing range, training range or virtual reality simulating range where each trainee is provided with their own target or targets on a shared screen, it may be desirable for each target to look correct to the respective trainee that's viewing that target. The single eye-point rendering approach does not provide targets rendered correctly for multiple eye-points. As may be seen in FIG. 2, the left most model 14 is perspectively correct for someone centrally located but would not be correct for someone standing directly in front of the left most model. In systems that support multiple trainees, all but maybe one of the participants involved in the training exercise will likely be viewing the rendered scene from viewpoints other than the rendering eye-point. Any participants not located at the rendering location eye-point, or at least close, will perceive parallax error and other unwanted inconsistencies.

The perceived parallax error creates problems for the participants during training. For example, during training that requires model distance estimation (for models of known size), the viewer will incorrectly estimate the distance to the model when viewed from a position that is far from the rendered eye-point. In addition, models farther to the left or right of the rendered eye-point will be skewed unnaturally from the perspective of those viewing the image from different locations.

Figure 3:
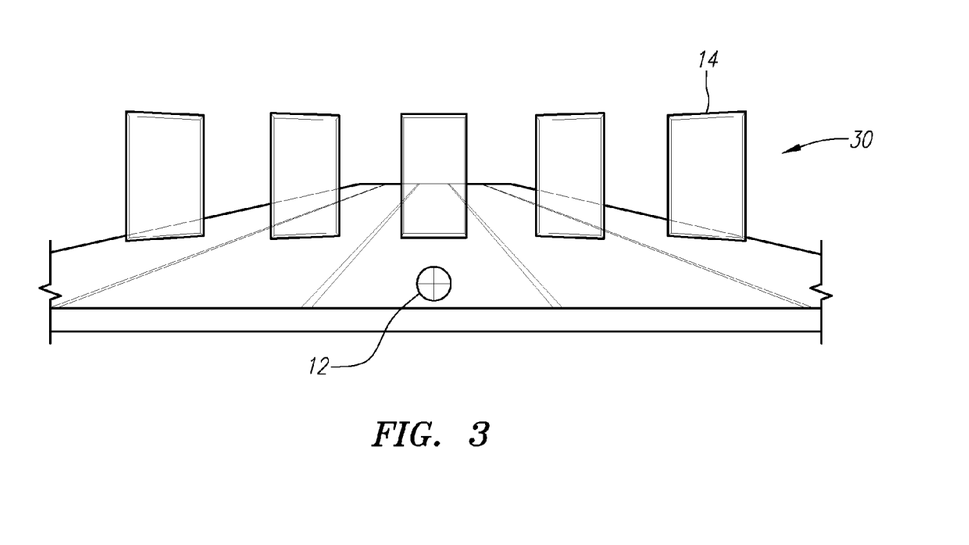
FIG. 3 illustrates simply rotating the models to face the eye-point, which results in unnatural skewing of geometry based on the perspective transformation from camera space to screen space.

Rather than rendering from a single eye-point, another approach is to simply rotate the models to face the eye-point of the viewer. FIG. 3 illustrates a scene with five rectangular blocks 14 spread across the scene wherein each block 14 has been rotated to face the rendering eye-point 12 in the center. One problem with this technique is that it will result in unnatural skewing of geometry based on the perspective transformation from camera space to screen space.

Figure 4A:
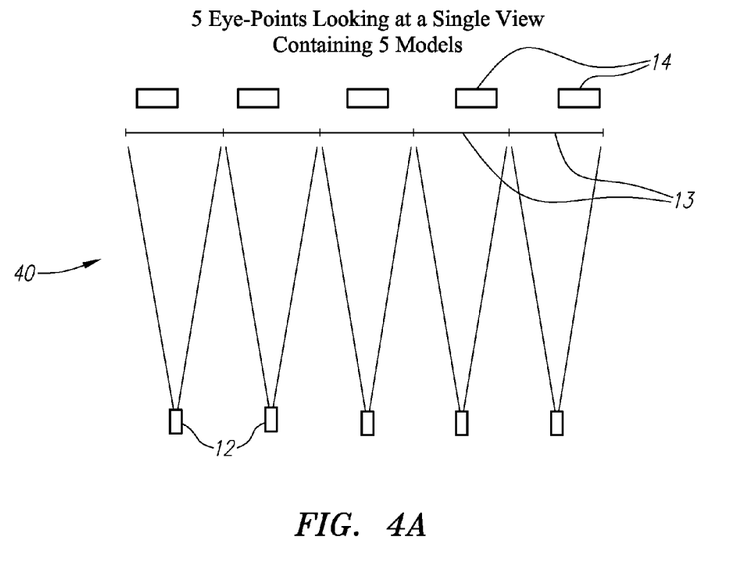
FIG. 4A illustrates a top down view of a scene with five rectangular blocks rendered using a separate eye-point for each block and portion of the background associated with that block.
Figure 4B:
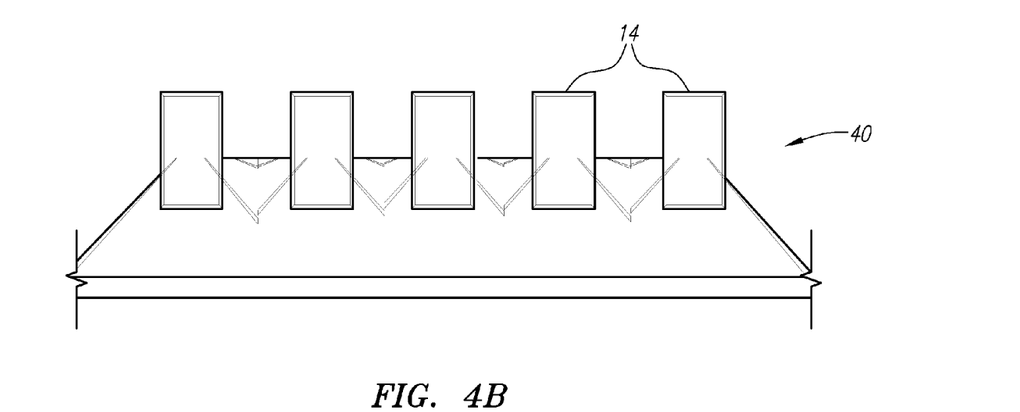
FIG. 4B illustrates a composite image of a scene with five rectangular blocks using the system of FIG. 4A.

Another approach for rendering that at least considers multiple viewpoints is illustrated in FIG. 4. In the embodiment shown in FIG. 4, each eye point 12 is used to render a selected portion 13 of the scene separately including both the foreground models 14 as well as the background. In FIG. 4, each eye-point's perspective is rendered separately and a composite image is constructed from images adjacent to one another. The images are combined to form a composite image based on the relative location of each eye-point 12.

One drawback to the approach illustrated in FIG. 4 is the individual eye-points 12 are discontinuous. Because each portion of the scene is rendered separately from a different eye-point 12, a vertical edge or blending/fading from one vertical slice to the next is visible in the final image. This blending/fading edge is particularly noticeable in the background scene. Moreover, in situations where a model moves across the boundary between rendered views, a noticeable unrealistic discontinuity will be evident to viewers.

Many prior approaches have attempted to have a completely separate view for each person. These approaches are cost prohibitive and still have issues with providing a continuous panoramic view. What is needed is a more effective way to render a scene with multiple objects where each object needs to be viewed from a separate eye-point with the correct perspective for that eye-point while still rendering a continuous scene.

SUMMARY OF THE EMBODIMENTS

In view of the foregoing, an object according to one aspect of the present patent document is to provide methods and apparatuses for rendering three dimensional images where objects have the correct perspective for multiple viewpoints. In preferred embodiments, these renderings are used in virtual training apparatus and other systems having multiple participants. Preferably, the methods and systems address, or at least ameliorate, one or more of the problems described above. To this end, a method for rendering a scene is provided. In some embodiment the method comprises: rendering a first model and a background scene from a first eye-point using a first projection matrix to form a first image; identifying a second model to be rendered from an eye-point other than the first eye-point; identifying a second eye-point to render the second model from; computing a second projection matrix to render the second model from the second eye-point; rendering the second model using the asymmetric projection matrix to form a second image; and, forming a composite image by overlaying the second image on the first image.

In some embodiments, the second model or models are tagged such that they may be identified throughout the process. Depending on the embodiment, models may be selected manually for tagging or automatically.

In preferred embodiments numerous different models may be rendered from numerous different eye-points. However, in preferred embodiments, a single view matrix is used to render both the first model and the second model.

Although the eye-point that renders the background is typically centered along the horizontal axis of the scene, in other embodiments it may be located in other locations. In addition, in preferred embodiments, the various different eye-points are evenly spaced along the horizontal axis of the scene. However, in other embodiments, the eye-points may be unevenly spaced along the horizontal axis.

In some embodiments, the models that require a custom asymmetric projection matrix and separate rendering may be identified and associated with an eye-point automatically. In some embodiments, the models are identified by comparing a screen location of the model relative to the first eye-point or another eye-point.

In embodiments that support multiple trainees, the method may further comprise moving the second model to a position that is a same distance from the first eye-point as the first model.

In another aspect of the present patent document, a non-transitory computer readable medium containing program instructions for rendering a three dimensional scene is provided. When the program is executed by one or more processors it causes the one or more processors to carry out the method which comprises: rendering a first model and a background scene from a first eye-point using a first projection matrix to form a first image; identifying a plurality of models to be rendered from eye-points other than the first eye-point; identifying a plurality of eye-points to render the plurality of models from; computing a new projection matrix for each eye-point in the plurality of eye-points; rendering each model in the plurality of models from its respective identified eye-point to form a plurality of images; and, forming a composite image by overlaying the plurality of images on the first image.

Depending on the embodiment, any number of eye-points may be supported. In a preferred embodiment, five or more eye-points may be used.

As described more fully below, systems, apparatuses and methods for rendering a scene are provided. Further aspects, objects, desirable features, and advantages of the systems, apparatuses and methods disclosed herein will be better understood from the detailed description and drawings that follow in which various embodiments are illustrated by way of example. It is to be expressly understood, however, that the drawings are for the purpose of illustration only and are not intended as a definition of the limits of the claimed embodiments.

DETAILED DESCRIPTION OF THE EMBODIMENTS

The following detailed description includes representative examples utilizing numerous features and teachings, both separately and in combination, and describes numerous embodiments in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

Some portions of the detailed descriptions that follow are presented in terms of algorithms and sequences of operations which are performed within a computer memory. These algorithmic descriptions and representations are the means used by those skilled in the data processing arts to most effectively convey the substance of their work to others skilled in the art. An algorithm or sequence of operations is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying" or the like, refer to the action and processes of a computer system, or similar electronic device, that manipulates and transforms data represented as physical (electronic) quantities within the computer system's registers and memories into other data similarly represented as physical quantities within the electronic device's memory or registers or other such information storage, transmission or display devices.

The embodiments disclosed also relate to an apparatus for performing the operations herein. This apparatus may be specially constructed for the required purposes, or it may comprise a general purpose processor selectively activated or reconfigured by a computer program stored in the electronic device. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, Flash memory, magnetic or optical cards, or any type of media suitable for storing electronic instructions, and each coupled to a computer system bus.

The algorithms presented herein are not inherently related to any particular electronic device or other apparatus. Various general purpose systems may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the embodiments as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help understand how the present teachings are practiced, but not intended to limit the dimensions and the shapes shown in the examples.

In the present patent document, methods and systems for rendering a three dimensional scene with objects rendered from multiple viewpoints are provided. In a preferred embodiment, the view projection that is applied to the rendering of select models (i.e. the models of interest for a given eye-point) has the proper asymmetry to compensate for the eye-point's shifted location relative to the rendered viewpoint for the panoramic scene.

Figure 5A:
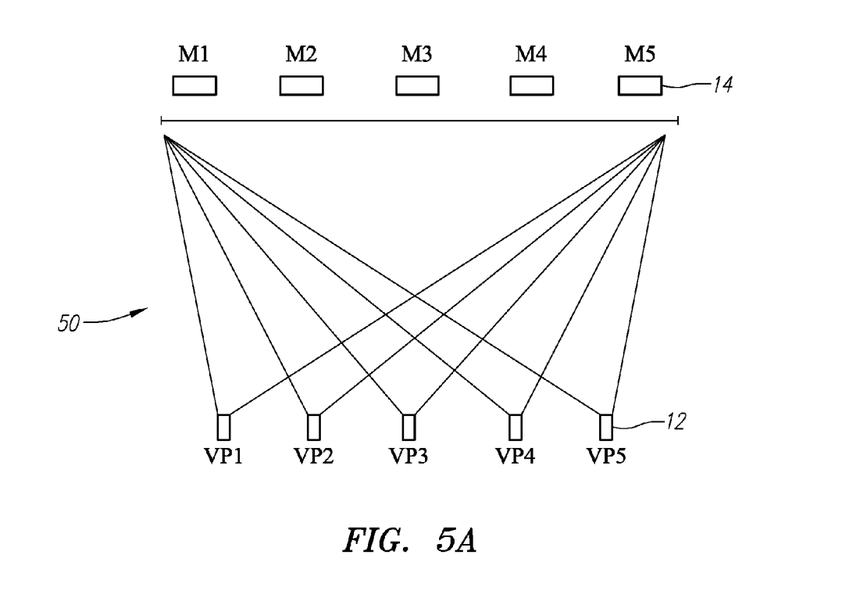
FIG. 5A illustrates a top down view of one embodiment of a individual eye-point parallax correction system.

FIG. 5A illustrates an example of a system for rendering a three dimensional scene with a plurality of models 14 for a plurality of eye-points 12. As may be seen in FIG. 5A, five models 14 labelled M1-M5 appear across the scene. Each of the five models needs to be rendered correctly for five eye-points 12 labelled VP1-VP5. In particular, M1 should be rendered correctly for VP1 and M2 for VP2 etc. Moreover, the background should be rendered seamlessly for all eye-points 12. In order to accomplish this, as will be explained in more detail below, embodiments of the present patent document use custom projection matrices to render each object M1-M5 while using the same view matrix for all models and the background.

In a preferred embodiment, only the model(s) 14 of interest for a particular eye-point 12 are rendered from that eye-point 12; the background scene is rendered from the center eye-point 12. In such a preferred embodiment, this means that the background image will be rendered seamlessly while the respective models 14 of interest for each eye-point 12 will be composited such that they will appear perspectively correct for that specific viewpoint.

In at least one aspect of the present patent document, a method and/or system for correcting multiple eye-points 12 within a homogenous 3-dimensional virtual environment is provided. In preferred embodiments, the rendering calculations are performed on a computer.

In a preferred embodiment, the method comprises: identifying models 14 requiring perspective correction in a scene; updating the transform of each identified model 14; identifying an eye-point 12 each identified model 14 belongs to; computing a custom perspective for each eye-point 12; in the rendering loop of the graphics engine: pushing the standard view matrix of the middle eye-point which covers the entire scene; pushing the standard projection matrix of the standard scene; for each identified model, pushing a custom matrix on to the transform stack and rendering the identified model 14; creating a composition image with the custom renderings of each model 14 and the background image; and presenting the final rendered scene to a display.

In other embodiments, a display, and a computer in electronic communication with the display, where in the computer contains an algorithm that executes various methods to render a scene is provided. Preferably, the entire system is used in conjunction with a multi-player training system. However, the system may be used with numerous different systems including video games, movies, simulators and virtual reality systems to name a few.

Embodiments of the method identify models or objects 14 requiring perspective correction. In preferred embodiments, the models and/or objects 14 are not part of the background but rather foreground objects. The models and/or objects 14 that need to have perspective correction may be marked or tagged such that they may remain identifiable throughout the process. The tag may be used during the rendering and model update steps to calculate unique (Model×View×Projection) composite matrices for rendering their respective models 14. A model matrix maps an object from object space to world space. A view matrix maps an object from world space to camera space. A projection matrix maps an object from camera space to screen space.

The models and/or objects 14 may be identified by a user who selects which models are to be tagged or automatically selected by software that can distinguish between models that need to be tagged and models that may be rendered without correction.

Once the models 14 have been identified, the desired eye-point 12 the model 14 needs to be associated with may be identified. In preferred embodiments, an eye-point 12 may be selected using screen space position. In some embodiments, the screen space may be divided into a number of evenly spaced eye-points 12. However, in other embodiments, spacing can also be unevenly distributed if non-uniform spacing is desired. Depending on the embodiment, any number of eye-points 12 may be used. In a preferred embodiment, five or more eye-points 12 may be used.

In a preferred embodiment, an eye-point 12 may be calculated automatically using a variety of different algorithms. In a preferred embodiment, the homogeneous screen-space position is computed based on the display resolution and desired perspective configuration (overall scene Field-of-view, near clipping plane, and far clipping plane).

Screen Space position: $S.xyzw = W.xyz1 * \text{Projection Matrix}$

Homogeneous Screen Space position: $H.xyz = \dfrac{S.xyz}{S.w}$

Computed EyePoint Index($EPI$) =

$$\text{floor}\left(\dfrac{(H.x + 1.0) * (\text{Number of EyePoints})}{2}\right)$$

In preferred embodiments, H.x (horizontal spacing) is used to calculate various eye-points. However, in other embodiments, H.y (vertical spacing) can also be used for tiling eye-points vertically.

Once the models have been selected and are associated with an eye-point, a custom perspective asymmetry for each eye-point may be calculated. In preferred embodiments, the following equations may be used to calculate the custom perspective asymmetry.

Screen Space Position for Eyepoint =

$$PE = \left(\text{Screen Width} * \left(\frac{2*EPI + 1.0 - (\text{Number of EyePoints})}{(\text{Number of EyePoints})}\right), 0, 0\right)$$

$$PE = \left(\text{Screen Width} * \left(\frac{EPI - \text{Center EyePoint Index}}{\text{Number of EyePoints}}\right), 0, 0\right)$$

$d$ = Distance from the eye to the screen plane.

$n$ = View frustum near clipping plane $f$ = View frustum far clipping plane

Left Edge of the Projection Plane in EYE SPACE: $projLeftTop.x =$
$$-\text{Width} * 0.5$$

Top Edge of the Projection Plane in EYE SPACE: $projLeftTop.z =$
$$\text{Height} * 0.5$$

$$l = (projLeftTop.x - PE.x) * \frac{\text{nearplane}}{\text{distance}}$$

$$r = (-projLeftTop.x - PE.x) * \frac{\text{nearplane}}{\text{distance}}$$

$$b = (-projLeftTop.z) * \frac{\text{nearplane}}{\text{distance}}$$

$$t = (projLeftTop.z) * \frac{\text{nearplane}}{\text{distance}}$$

In preferred embodiments, the following asymmetrical projection matrix may be used to render the identified models:

$$P = \begin{bmatrix} \frac{2n}{r-l} & 0 & \frac{r+l}{r-l} & 0 \\ 0 & \frac{2n}{t-b} & \frac{t+b}{t-b} & 0 \\ 0 & 0 & -\frac{f+n}{f-n} & -\frac{2n}{f-n} \\ 0 & 0 & -1 & 0 \end{bmatrix}$$

In a preferred embodiment, the view projection that is applied to the rendering of select models (i.e. the models of interest for a given eye-point) has the proper asymmetry to compensate for the eye-point's shifted location relative to the rendered viewpoint for the panoramic scene.

In preferred embodiments, the various components may be pushed through the rendering loop of the graphics engine. The standard view matrix of the middle eye-point, which covers the entire scene, is pushed into the rendering loop of the graphics engine. The standard projection matrix of the standard scene (without any asymmetry) is then pushed through the rendering loop of the graphics engine. The standard projection matrix is used for rendering all non-tagged models and the background environment.

Whenever a tagged model needs to be rendered, a custom projection matrix (P matrix) is pushed on to the transform stack. This provides the asymmetrical perspective correction and eye-point shifting for the horizontal location of each models desired eye-point. If anything else needs to be rendered that is not tagged, the standard projection matrix may be restored.

After each of the portions of the scene and model have been rendered, the various portions may be combined into a single composite image. In at least one aspect of the present patent document, a method where a composite scene is produced from a plurality of models of interest rendered from different viewpoints while the background is rendered from a single viewpoint is provided.

The final rendered scene may be presented to the display. In some embodiments, the display may be on a wall display screen or regular display screen. In some embodiments, the display may be on a projected display.

In preferred embodiments, parallax correction is addressed, where the models of interest for a given eye-point have the proper asymmetry to compensate for the eye-point's shifted location relative to the rendered viewpoint for the panoramic scene, or where the background image will be rendered seamlessly while the respective models of interest for each viewpoint will be composited such that they will appear perspectively correct for that specific viewpoint.

To this end, different models in a single scene may be rendered appropriately for different eye-points and combined into a single composite image. For example, in FIG. 5A, a transform or transforms may be constructed for an object M1 to transform the rendering viewpoint from eye-point V3 to eye-point V1.

Figure 5B:
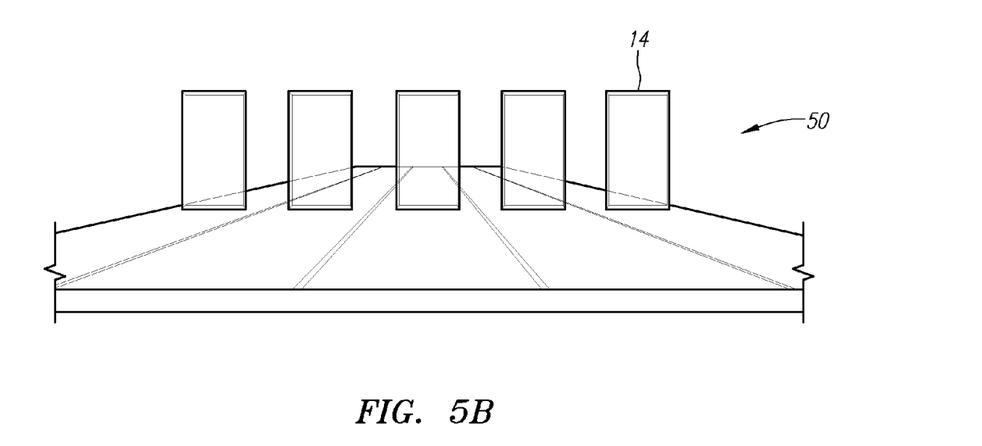
FIG. 5B illustrates a scene with five rectangular blocks rendered using the system of FIG. 5A.

FIG. 5B shows the result of the composite image. Notice that the background image is rendered contiguously without a vertical inconsistencies. Moreover, each model/object 14 is rendered correctly for its respective viewpoint V1-V5.

Returning to FIG. 5B, which represents one preferred embodiment, there may be 5 viewpoints (labeled VP1-VP5). In a system for training, each model may be specific to a trainee or trainee position. To this end, each trainee has a model of interest that they are viewing (labeled M1-M5). In such a non-limiting example:

1. The entire background scene and M3 would be rendered from VP3;
2. M1 would be rendered from VP1;
3. M2 would be rendered from VP2;
4. M4 would be rendered from VP4;
5. M5 would be rendered from VP5; and,
6. The renderings are all composited together.

When training multiple students with the same scenario, it may be desirable for each student to see the same target at the same distance in their respective area of the screen. For example, in some embodiments, it may be desirable for the models 14 to remain in their correct positions relative to objects rendered as part of the background—rocks, bushes, ground debris, etc. Because the background objects will all be rendered from the center eye-point and the models 14 will be rendered from individual shooter eye-points, it may be necessary to adjust the position and/or orientation of the models prior to rendering such that they appear in the same position and orientation relative to the background objects. Since the background is rendered from a single perspective, if you place the targets at the same Y-axis value, they may end up at different distances with respect to the background as seen in the diagram.

Figure 6A:
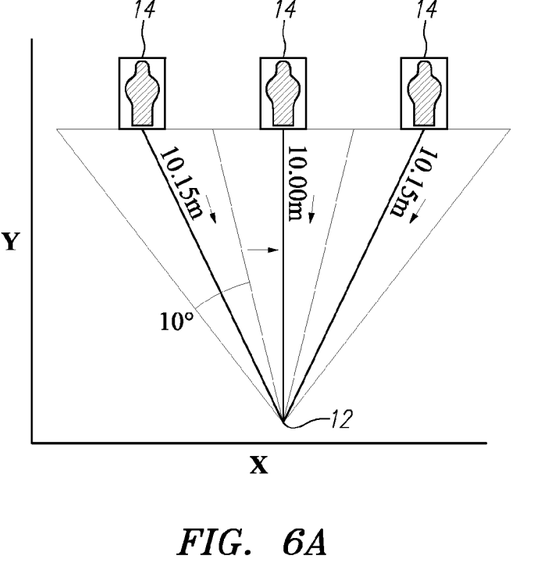
FIG. 6A illustrates a scene with three objects placed along a straight line an equal distance away from the x-axis.

FIG. 6A illustrates a scene with three objects placed along a straight line an equal distance away from the x-axis. As may be seen in FIG. 6A, the two models 14 not directly in front of the center eye-point 12 are farther away from the center eye-point 12. If a background rock is rendered 10 meters away from the center-eye point 12 in different locations across the X-axis, it will appear farther and farther in front of the model 14 as the distance increases away from the center eye-point 12. In some embodiments, this may be undesirable and the model's relative position with respect to the rock may need to be maintained. To this end, the models 14 may be moved with respect to the background prior to rendering.

Figure 6B:
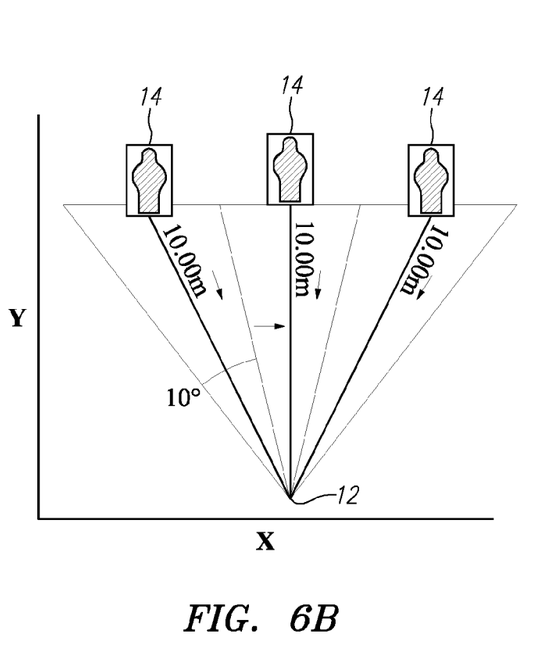
FIG. 6B illustrates a scene with objects that have had their locations adjusted with respect to the background.

FIG. 6B illustrates a scene with objects that have had their locations adjusted with respect to the background. In a preferred embodiment, once the models 14 that need to be adjusted are identified, a transform for each model 14 may be built or modified for authored position and/or orientation. The transform may be applied to move the models to the correct position with respect to the background as shown in FIG. 6B.

In embodiments where the models positions 14 are moved, an additional transform may be used to adjust the size of the models. Because the models will be rendered from eye-points that are more directly in front of them than the center eye-point, moving them closer may make them appear too big. Accordingly, in embodiments where the models 14 are moved, their size may also be adjusted so they appear the correct distance from their respective eye-point once rendered.

Figure 7:
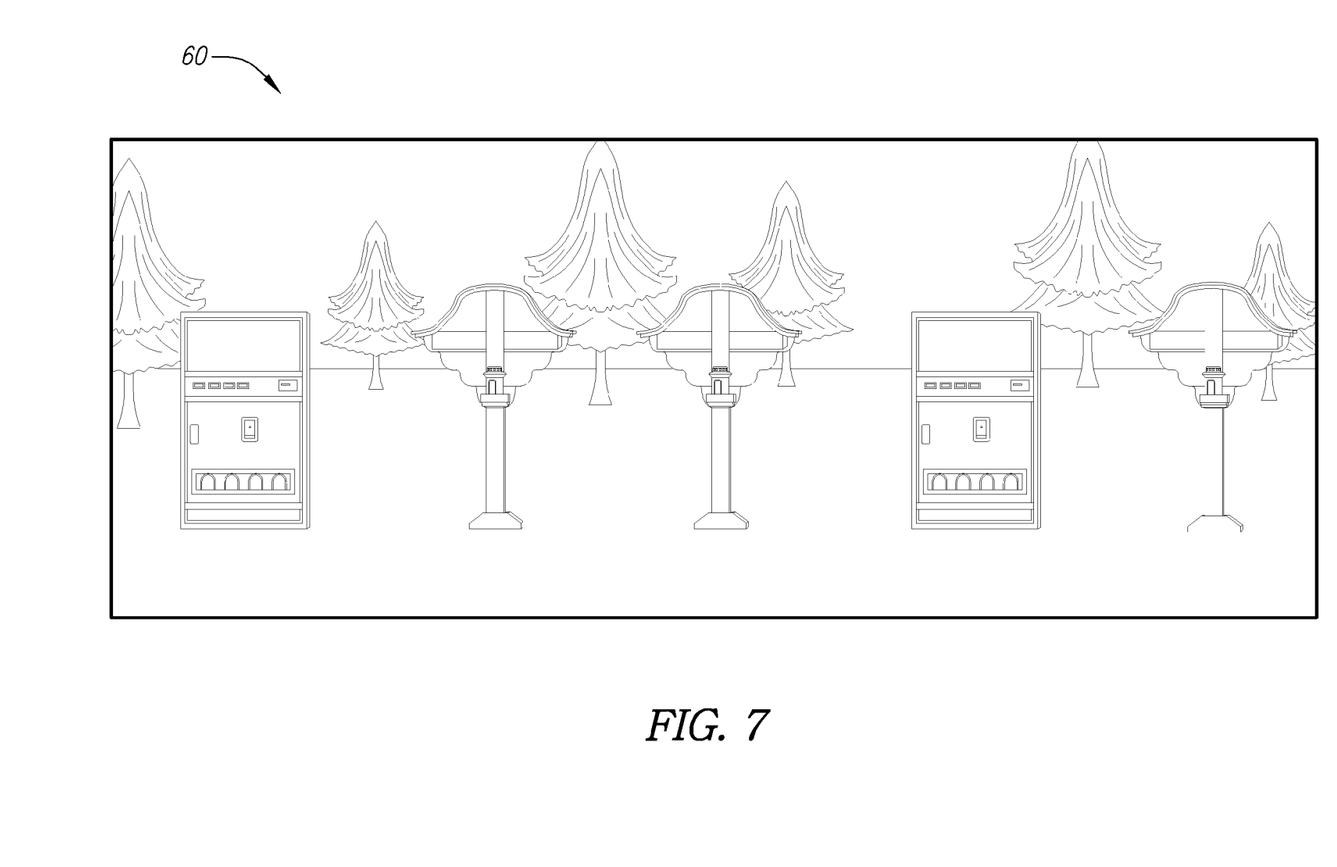
FIG. 7 illustrates an image rendered using one embodiment of a method for rendering a single viewpoint with perspective correction for each eye-points in a single rendering pass.

FIG. 7 illustrates the results of a rendered image using an embodiment of the present patent document. As may be scene, the background is rendered with no vertical imperfection lines and the models are each rendered correctly for 5 individual viewpoints.

Although the embodiments have been described with reference to preferred configurations and specific examples, it will readily be appreciated by those skilled in the art that many modifications and adaptations of the methods, processes and apparatuses disclosed herein are possible without departure from the spirit and scope of the embodiments as claimed hereinafter. Thus, it is to be clearly understood that this description is made only by way of example and not as a limitation on the scope of the embodiments.

What is claims is:

1. A method for rendering a scene comprising:
rendering a background scene;
rendering a first model from an eye-point of a first viewer location using a standard projection matrix to form a first image;
identifying a second model to be rendered independently from the background scene and from an eye-point other than the eye-point of the first viewer location;
identifying an eye-point of a second viewer location that is different from the first viewer location to render the second model from;
computing an asymmetric projection matrix to render the second model from the eye-point of the second viewer location wherein the asymmetric projection matrix has an asymmetry to compensate for the eye-point of the second viewer location;
rendering the second model independently from the background scene using the asymmetric projection matrix to form a second image; and,
forming a composite image by overlaying the second image, the first image and the background scene.

2. The method of claim 1, wherein the second model is tagged.

3. The method of claim 1, wherein eye-points of five different viewer locations are used to render five different models.

4. The method of claim 1, wherein a single view matrix is used to render both the first model and the second model.

5. The method of claim 1, wherein the eye-point of a first viewer location is centered along a horizontal axis of the scene.

6. The method of claim 1, further comprising an eye-point of a third viewer location wherein each eye-point is evenly spaced along a horizontal axis of the scene.

7. The method of claim 6, wherein a horizontal spacing of a homogeneous screen space is used to evenly space each eye-point along the horizontal axis of the scene.

8. The method of claim 1, wherein the identifying a second model step is performed by comparing a screen location of the second model relative to the eye-point of the first viewer location.

9. The method of claim 1, further comprising moving the second model to a position that is a same distance from the eye-point of the first viewer location as the first model.

10. The method of claim 1, wherein the background scene is rendered simultaneously with the first model and from the eye-point of the first viewer location using the standard projection matrix.

11. A non-transitory computer readable medium containing program instructions for rendering a three dimensional scene, wherein execution of the program instructions by one or more processors causes the one or more processors to carry out the method comprising:
rendering a background scene;
rendering a first model from an eye-point of a first viewer location using a standard projection matrix to form a first image;
identifying a plurality of models to be rendered independently from the background scene and from eye-points other than the eye-point of the first viewer location;
identifying a plurality of eye-points, each eye-point in the plurality of eye-points associated with a different viewer location than any other eye-point, to render the plurality of models from;
computing an asymmetric projection matrix for each eye-point in the plurality of eye-points wherein each asymmetric projection matrix has an asymmetry to compensate for a different eye-point in the plurality of eye-points;
rendering each model in the plurality of models independently from the background scene and from its respective identified eye-point with its respective asymmetric projection matrix to form a plurality of images; and,
forming a composite image by overlaying the plurality of images, the first image and the background scene.

12. The computer readable medium of claim 11, wherein each model in the plurality of models is tagged.

13. The computer readable medium of claim 11, wherein the plurality of eye-points is five or more.

14. The computer readable medium of claim 11, wherein a single view matrix is used to render the first model and each model of the plurality of models.

15. The computer readable medium of claim 11, wherein the eye-point of the first viewer location is centered along a horizontal axis of the scene.

16. The computer readable medium of claim 11, wherein each eye-point is evenly spaced along a horizontal axis of the scene.

17. The computer readable medium of claim 16, wherein a horizontal spacing of a homogeneous screen space is used to evenly space each eye-point along the horizontal axis of the scene.

18. The computer readable medium of claim 11, wherein the identifying a second model step is performed by comparing a screen location of the second model relative to the eye-point of the first viewer location.

19. The computer readable medium of claim 11, further comprising moving at least some of the models in the plurality of models to a position that is a same distance from the eye-point of the first viewer location as the first model.

20. The computer readable medium of claim 11, wherein the background scene is rendered simultaneously with the first model and from the eye-point of the first viewer location using the standard projection matrix.

* * * * *